United States Patent Office 3,326,828
Patented June 20, 1967

3,326,828
POLYOLEFIN-VINYL CHLORIDE POLYMER BLENDS COMPRISING CROSSLINKING AGENTS AND LEAD SALTS INCORPORATED AS HYDROCARBON SOLUTIONS
Frank A. De Melio, Bound Brook, N.J., assignor to Union Carbide Corporation, a corporation of New York
No Drawing. Filed Jan. 23, 1964, Ser. No. 339,590
10 Claims. (Cl. 260—23)

This invention relates to stabilized, flame-retarded olefin polymer compositions and particularly, to such compositions crosslinked with peroxides.

Crosslinked olefin polymers admixed with flame-retardant chlorinated compounds, have been used as metal coatings in general, and specifically as insulation for wire. The requirements for wire insulation coatings include among other qualities, not only flame resistance, but absence of corrosive attack of the wire substrate. In meeting the requirement of flame resistance by the addition of chlorinated compounds to the composition, the corrosion problem is increased since unstabilized chlorinated compounds produce HCl as a degradation product. The degradation of chlorinated compounds in these compositions is further accelerated by the presence of peroxide and the curing temperatures required for crosslinking the olefin polymers.

While many stabilizers are known in the prior art for retarding the degradation of chlorinated compounds, unfortunately they are not satisfactory in these wire coating compositions in protecting the wire substrate from corrosive attack. This deviation from their generally acceptable behavior as hydrogen chloride scavengers is believed due to the processing temperatures used, which are higher than those normally used with vinyl chloride polymers, as well as to the peculiar physical arrangement of the components in the coating compositions.

Normally, halogenated flame-retardants are incompatible with olefin polymers so that the chlorinated compound is normally incorporated into the coating formulations as a solid filler not as a melt or solution. During the mechanical blending of ingredients and subsequent curing operation, there is normally no fluxing or melting of the chlorinated compound inasmuch as hydrogen chloride may be evolved from the chlorinated compound and initiates degradation which attacks metallic substrates and promotes corrosion.

It is, therefore, an object of this invention to provide a stabilized non-corrosive olefin polymer metal coating composition.

It is a further object that the stabilizer be effective not only during the curing cycle but also afterwards during storage and use of the coated metal substrate.

It is still another object that the stabilizer be effective in wire coating compositions particularly with copper and tinned copper conductors.

It has now been found that a satisfactory metal coating composition which will not etch or corrode the metal substrate can be prepared from a mixture comprised of (1) A normally solid olefin polymer
(2) About 1 to 80%, based on the weight of the olefin polymer, of a chlorinated hydrocarbon flame-retardant
(3) About 0.1 to 5%, based on the weight of olefin polymer, of a crosslinking agent, and
(4) About 0.1 to 10% of a hydrocarbon solution of a hydrocarbon soluble organic lead compound, based on the weight of the olefin polymer, containing a sufficient amount of lead to inhibit the evolution of hydrogen chloride from the chlorinated hydrocarbon or preferentially accept the hydrogen chloride evolved from the chlorinated hydrocarbon.

In this composition the hydrocarbon solution of the lead compound plays a very unusual roll which is not easily understood or explained but it has been established that the mere presence of the lead compound does not produce the same or equivalent effect as does the lead compound dissolved in the hydrocarbon solvent. To be effective, it appears that the solubilized lead compound is absorbed into, or intimately coats each discrete particle of chlorinated compound in the composition, a role that is impossible and unsuited to solid lead compounds.

In the composition of this invention, any of the organo lead compounds soluble in the hydrocarbon solvent can be used. Preferred lead compounds are lead octoate, lead naphthenate and lead tallate, although other lead compounds which are soluble in hydrocarbon solvents can also be used if desired, such as lead hexanoate, lead heptanoate, lead oleate, lead linolenate, lead linolinate, tetraethyl lead, tetraphenyl lead and the like. The term "lead octoate" is hereby defined to include the lead salts of n-octanoic acid, isomeric methyl heptanoic acid and both 2-ethylhexanoic and 3-ethylhexanoic acids and the like.

Any normally liquid aliphatic, cycloaliphatic, or aromatic hydrocarbon solvent can be used in which the lead compound is soluble. Suitable cheap commercial solvents representative of this class of solvents includes petroleum spirits which are employed as general-purpose thinners and paint or varnish solvents, and meet the specifications of ASTM D-235-39; varnish makers and painters' naphtha having a boiling range of 200-300° F.; Stoddard solvent having a boiling point range of 300-400° F. and conforming to the specifications of ASTM D-484-4; petroleum ether with a boiling range of 68-275° F.; petroleum aromatics with a boiling range of 160-280° F.; and the like.

The concentration of lead compound in the hydrocarbon solvent is not critical, being limited at the upper range by its solubility in the hydrocarbon solvent and the lower range by such empirical considerations as the effect of increased amounts of solvent on the rheological properties of the coating composition. Preferably, the hydrocarbon solution contains from 10 to 30 percent by weight of the lead compound. A preferred range of lead in the total coating composition is about 0.1 to 2% by weight although other ranges can be used if desired depending on the amount of the chlorinated flame retardant in the olefin polymer. Normally the amount should be at least sufficient to inhibit the evolution of hydrogen chloride from the chlorinated flame retardant compound (or preferentially accept the hydrogen chloride evolved from the compound) so that the hydrogen chloride cannot attack metallic substrates such as wire and cable on which the crosslinked olefin polymer composition is coated.

The term "olefin polymer" is used in the present specification and claims to denote normally solid homopolymers of olefinically unsaturated hydrocarbons as well as normally solid copolymers thereof. Preferred olefin polymers in this invention contain at least 10 percent by weight of a combined mono-olefinically unsaturated hydrocarbon having from 2 to 4 carbon atoms inclusive, i.e., butene-1, propylene and ethylene. Ethylene polymers are especially preferred as the olefin polymer used in the composition of this invention.

The ethylene polymer preferred in the composition should desirably be a grade suitable for injection molding having a density of about 0.88 to 0.97. However, this selection is not critical and other grades of ethylene polymer, including high density polyethylene, may also be used as well as copolymers of ethylene combined with one or more other organic compounds copolymerizable therewith which contain polymer producing unsaturation, as for example, monoolefins such as propylene, butenes, pentenes, hexenes, heptenes, octenes, dodecenes, octadecenes and the like; diolefins such as butadiene, isoprene, chloroprene, hexadiene, octadiene, decadiene and the like; acetylene; other olefinically unsaturated comonomers such as vinyl formate, vinyl acetate, vinyl propionate, vinyl butyrate, vinyl 2,4-dimethylpentoate, vinyl pelargonate, vinyl stearate, vinyl pivalate, vinyl tert-butyl acetate, vinyl benzoate, vinyl diethylacetate, vinyl beta, gamma-dimethyl valerate, vinyl thioacetate, vinyl alcohol, styrene, methylstyrenes, chlorostyrenes, alkyl monoesters of 2-butene-1,4-dioic acid, diallyl oxalate, diallyl sebacate, methallyl alcohol, allyl acohol, maleic anhydride, diethyl maleate, diethyl fumarate, diethyl citraconate, 9-methylenefluorene, beta-methylene-beta-propiolactone, vinyl isocoumarans such as 1,1,3,3-tetramethyl-4-vinylisocoumaran, 1,2-alkylene oxides, N-n-butylmaleimide, N-isobutylmaleimide, N-vinylphthalimide, N-methyl-N-vinyl acetamide, vinyl triethoxysilane, bicycloheptene, bicycloheptadiene, divinyl phosphonate, N - vinylcarbazole, methyl acrylate, ethyl acrylate, butyl acrylate, n-octyl acrylate, 2-ethylhexyl acrylate, decyl acrylate, lauryl acrylate, hexadecyl acrylate, octadecyl acrylate, methyl methacrylate, ethyl methacrylate, butyl methacrylate, octyl methacrylate, 2-ethylhexyl methacrylate, decyl methacrylate, lauryl methacrylate, tetradecyl methacrylate, hexadecyl methacrylate, octadecyl methacrylate, acrylic acid, methacrylic acid, methyl vinyl ether, ethyl vinyl ether, n-butyl vinyl ether, isobutyl vinyl ether, t-butyl vinyl ether, divinyl ether, vinyl methyl ketone, vinyl ethyl ketone, vinyl butyl ketone, terpenes, bicyclo(2.2.1)-2-heptenes, stilbene, limonene, dichloroethylene, vinyl chloride, vinyl fluoride, vinylidene chloride, vinylidene fluoride and the like; and miscellaneous compounds such as carbon monoxide, formaldehyde, sulfur dioxide and the like.

If desired, natural rubber or synthetic rubbers such as polybutadiene, butadiene-styrene copolymers, butadiene-acrylonitrile copolymers, polysulfides, polyisoprenes and the like can be admixed and blended with or even substituted for ethylene polymer in the coating compositions.

The preferred chlorinated hydrocarbon flame-retardant of this invention is a vinyl chloride polymer. Any normally solid vinyl chloride polymer can be employed in the coating composition although a finely divided plastisol grade is preferred in order to minimize mixing problems. Small particle size permits a greater loading where this is a requirement for a particular end use. The amount of vinyl chloride polymer to be compounded is determined at the lower level by the minimum flame resistance needed and at the upper level by the physical properties of the cured composition. Cold temperature flexibility and elongation are the physical properties of chief concern. About 1 to 80% of vinyl chloride polymer (based on the weight of olefin polymer in the composition) can be used. A preferred range lies between about 10 and 31%. Either vinyl chloride homopolymers or copolymers can be utilized as the flame-retardant. Particularly preferred vinyl chloride copolymers are those which contain at least 80% vinyl chloride and up to 20% vinyl acetate or vinylidene chloride combined therein. If desired other vinyl chloride copolymers containing such comonomers as vinyl acetate, acrylonitrile, diethyl fumarate, isobutyl vinyl ether, isobutylene, isopropenyl acetate, and the like combined therewith can also be employed.

Other flame-retardant compounds can be used if desired in place of vinyl chloride polymer in the coating composition. Such compounds include chlorinated ethylene polymers, vinylidene chloride polymers, perchloropentacyclodecane, benzene hexachloride, naththalene tetrachloride, 1,2,3,4 - tetrachloronaphthalene, 5,6,7,8-tetrachlorotetralin, 1,2,3,4,5 - pentachloronaphthalene, 1,2,3,4,5,6,8-heptachloronaphthalene, and the like.

Preferably the vinyl chloride polymers when employed in this invention are separately stabilized with one or more of the well known vinyl chloride stabilizers such as tin esters such as dibutyl tin dilaurate, epoxy resins, solid lead stabilizers, and the like as are well known in the art, although such is not necessarily critical in the practice of this invention. It is possible for instance to rely solely on the hydrocarbon soluble lead compound to stabilize the vinyl chloride resin although when other stabilizers are intimately mixed in the vinyl chloride polymer, smaller amounts of the hydrocarbon soluble lead compound can be used to accomplish the same result.

As is well known in the art, crosslinking of ethylene polymers can be readily effected by heating the ethylene polymers containing small amounts of free radical generating, crosslinking agents admixed therewith to a temperature at which free radicals are generated. Examples of free radical, generating crosslinking agents include organic peroxides such as benzoyl peroxide, 2,6-dichlorobenzoyl peroxide, lauroyl peroxide, di-t-butyl peroxide, di-t-butyl perhpthalate, dibenzal diperoxide, t-butyl perbenzoate, 2,5-dimethyl-2,5-di-(t-butylperoxy)hexane, 2,5-dimethyl-2,5-di(t-butylperoxy)hexyne-3, dicumylperoxide and the like, and azo compounds such as azobisisobutyronitrile, azodicarbonamide, $\alpha,\alpha'$ - azodicyclohexanecarbonitrile, azobis - $\alpha,\alpha$ - dimethylvaleronitrile, dimethyl - $\alpha,\alpha'$-azodiisobutyrate and the like.

The preferred crosslinking agents of this invention are organic peroxides of which dicumyl peroxide is especially preferred.

About 0.1 to 5% of the crosslinking agent can be used with about 1 to 3% being a preferred range.

The coating composition can also contain such optional ingredients such as fillers, pigments, antioxidants and additional stabilizers for either the olefin polymer or the vinyl chloride polymers or both as well as additional flame-proofing compounds. For example, antimony trioxide, titanium dioxide, or barium sulfate may be used. Di-t-butyl-p-cresol, 4,4'-thiobis-di-tert butyl meta cresol, butylated anisole, styrenated phenol, di-2-naphthyl-p-phenylenediamine, diphenylol-propane, propyl gallate and the like can be employed as antioxidants. Epoxy stabilizers that can be used in conjunction with the lead compounds include butyl epoxy stearate, epoxidized soy bean oil, epoxidized peanut oil and the like, and may be separately incorporated into the vinyl chloride polymer before the composition is prepared as is preferred, or may be admixed with the hydrocarbon solution of the lead compound while the composition is being prepared. Fillers, stabilizers, pigments, etc. for the olefin polymer may be separately admixed and compounded with the olefin polymer or they may be added into the formulation compounding of the vinyl chloride polymer when the hydrocarbon solution of the lead compound is admixed into the olefin polymer-vinyl polymer mixture.

It has also been found in this invention that a synergistic corrosion inhibiting effect is obtained when about 0.1% to 6% of a solid basic lead phthalate stabilizer is used in conjunction with a hydrocarbon solution of a lead compound in the coating composition. For this purpose either the monobasic or dibasic lead phthalate is suitable. Concentrations higher than 6% of basic lead phthalate can be employed where brittle temperature, percent elongation and other physical properties of the wire substrate coating are not critical. In these coating compositions, basic lead phthalate alone inhibits degradation of the vinyl chloride polymer during the curing or crosslinking operation but corrosion of the wire substrate occurs subsequently under heat-accelerated aging conditions. When used in combination with hydrocarbon solutions of lead compounds, this mixture affords excellent stabilization of wire substrates for prolonged storage periods in excess of that obtained by either the solutions of lead compounds or basic lead phthalate alone. While lead phthalate is the preferred solid lead stabilizer in this synergistic combination, other solid lead stabilizers can also be used if desired including lead salicylate, lead oxide, basic lead sulfate and the like.

The coating compositions can be prepared by mixing the component ingredients in an internal mixer or on a heated roll mill, preferably at a temperature of about 120° C. to 160° C., and fluxing without initiating substantial crosslinking by the crosslinking agent at least until all of the hydrocarbon solvent has been evaporated or removed from the composition. Preferably, the temperature and/or the time of fluxing is maintained below that sufficient to cause the vinyl chloride polymer to flux and fuse in the mass. Discrete particles of the vinyl chloride polymers are desired in this invention and yield the most useful of the coating compositions.

In the preparation of the compositions herein, the crosslinking agent used usually will determine the maximum temperature to be used. Thus, for example, with dicumyl peroxide the mixing temperature should be below 135° C. to preclude crosslinking of the coating composition in the mixer itself. Similarly, with di-t-butyl peroxide the temperature should not exceed 120° C. All of the ingredients can be added to the mixer at the same time although it is preferred to blend the hydrocarbon solution of the lead compound with the solid, particulate vinyl chloride polymer in a prior step. This preference applies not only to the hydrocarbon soluble lead stabilizers but to the solid lead stabilizers as well. When the mixing operation is completed the coating composition can be pelleted, diced or put into any conventional form used by those skilled in the art for storing or packaging metal coating compounds. Pellets or short rods are particularly useful when the coating composition is to be extruded as a wire coating.

The coating of the metal substrate with these compositions can be effected by any of the methods well known in the art such as dip coating, extrusion, molding and the like. This operation can be carried out at a temperature in the range of about 160° C. to about 200° C. in about 1 to 20 minutes, the temperature at least being sufficient to induce the crosslinking of the olefin polymer.

The compositions of this invention are useful for coating any metal substrate subject to corrosive attack by small amounts of hydrogen chloride. Copper conductors intended for use at temperatures up to about 300° F. often are coated with pure tin or a tin-lead alloy, the former being more widely used. The tin is commonly applied in a hot dip process leaving a coating on the copper 50 to 65 millionths of an inch thick. Tin coated copper conductors are sometimes used in wires that have insulation suitable for use at temperatures as high as 400° F. where the wires are usually not operated for any appreciable length of time at this temperature. Although copper and tinned copper are of particular interest because of their wide use as electrical conductors, other metals such as iron, steel, aluminum and the like are also within the scope of substrates contemplated.

A typical coating composition as used in this invention is presented in Table 1 below with the ingredients given as percentages by weight of the total mixture.

Table 1

Component: Parts by weight
Ethylene homopolymer (density of about 0.92 and melt index of about 2) _____ 60–80
Polyvinyl chloride _____ 15–35
Dicumyl peroxide _____ 0.3–3.0
Epoxidized soy bean oil _____ 0.1–1.0
Lead octoate (25% solution in petroleum ether) _____ 1.0–4.0

CORROSION TEST

Various metal coating compositions were compounded and evaluated for corrosion resistance using AWG #14 gauge copper wire and AWG #20 gauge tinned copper as the metal substrates. The wires were placed between two sheets of the test composition and formed into plaques 3½" x 3½" x 0.075" at 175° C. and 400 p.s.i. for 10 minutes. The plaques were then placed in an oven at 120° C. and specimens removed for examination at various time intervals. The coatings were then peeled away and the metal surface examined visually for corrosion which can readily be observed as an etching and sometimes a pitting of the metal. The number of hours elapsed at 120° C. until corrosion occurred was recorded as "hours to corrosion" for various compositions including those of the present invention. The results of these corrosion tests are delineated in Table 2 showing the identity of the metallic stabilizer used as part of the coating composition given in Table 1.

These data demonstrate the superiority of the lead octoate stabilizer applied from hydrocarbon solvent solution, over other metallic stabilizers which are conventionally used. These data also demonstrate that the protection of a metal substrate against corrosion under the environmental conditions encountered with typical flame resistant coating compositions calls for the achievement of more efficient and effective hydrogen chloride scavenging than is required for the stabilization of vinyl chloride polymers themselves. This higher stabilization standard is due to the fact that the vinyl chloride polymers can tolerate some contact with hydrogen chloride without undergoing appreciable deterioration of physical properties or appearance whereas even the briefest contact of a metal surface with hydrogen chloride induces a corrosive process which continues in the metal even after the hydrogen chloride is removed or neutralized.

In all of the controls and the example shown in Table 2, the same formulation was employed so as to yield the same amount of metallic stabilizer, only in the example, the lead octoate was admixed in the composition as a 25% solution in petroleum ether.

Table 2

| Metallic Stabilizer | Hours to corrosion at 120° C. | |
| --- | --- | --- |
|  | Copper | Tinned Copper |
| Control 1—Ba-Cd Laurate | 39 | 39 |
| Control 2—Ba-Cd Phenate | 39 | 39 |
| Control 3—Ba-Cd Phenate and Triphenyl Phosphite Chelator | 39 | 39 |
| Control 4—Ba-Cd-Zn Phenate |  | 39 |
| Control 5—Ba-Stearate |  | 39 |
| Control 6—Tin maleate | 39 |  |
| Example—Lead octoate (25% by wt. in petroleum ether) | 87 | 87 |

Where longer periods of protection against corrosion at 120° C. are required, the synergistic action of lead octoate and lead phthalate can be utilized. The formulation outlined in Table 3 is recommended for general purpose wire coatings. One such formulation falling within such limits when used as a coating for both copper and tinned copper wire caused no corrosion after a period of 672 hours at 120° C.

Table 3

Component: Parts by weight
Polyethylene _____ 50 to 70
Polyvinyl chloride _____ 15 to 35
Lead octoate (24% by weight in petroleum ether) _____ 1.0 to 4.0
Epoxidized soy bean oil _____ 1.0 to 4.0
Basic lead phthalate _____ 1.0 to 6.0
Antimony trioxide _____ 5.0 to 8.0
Polymerized trimethyldihydroquinoline __ 0.1 to 1.0
Dicumyl peroxide _____ 0.3 to 3.0

If chlorinated hydrocarbons such as perchloropentacyclodecane, benzene hexachloride or the like are substituted for vinyl chloride polymers as the flame retardant component in the composition given in Table 3 substantially equivalent results are obtained.

What is claimed is:

1. Method for preparing a flame-resistant, non-corrosive, metal coating composition which comprises blending a mixture of:
   (1) a normally solid olefin polymer,
   (2) about 1 to 80%, based on the weight of olefin polymer, of a particulate, normally solid vinyl chloride polymer,
   (3) about 0.1 to 5%, based on the weight of olefin polymer, of a free radical crosslinking agent selected from the class consisting of peroxides and azo compounds, and
   (4) 0 to about 6%, based on the weight of olefin polymer, of a solid basic lead phthalate, with about 0.1 to 10% based on the weight of olefin polymer of a solution of an organo lead compound in a hydrocarbon solvent at a temperature of about 120 to 160° C. until substantially all of the hydrocarbon solvent has been removed from the composition, said solution containing a sufficient amount of said organo lead compound to inhibit the evolution of hydrogen chloride from the vinyl chloride polymer.

2. The composition of the method claimed in claim 1.

3. The composition claimed in claim 2 wherein the free radical, crosslinking agent is an organic peroxide.

4. The composition claimed in claim 2 wherein the organic peroxide is dicumyl peroxide.

5. The composition claimed in claim 2 wherein the olefin polymer is a normally solid ethylene polymer.

6. The composition claimed in claim 5 wherein the ethylene polymer is polyethylene.

7. The composition claimed in claim 2 wherein the organo lead compound is lead octoate.

8. Metal wire coated with the crosslinked composition claimed in claim 2.

9. Coated metal wire claimed in claim 8 wherein the metal is copper.

10. Coated metal wire claimed in claim 8 wherein the metal is tinned copper.

References Cited

UNITED STATES PATENTS

| | | | |
|---|---|---|---|
| 2,075,543 | 3/1937 | Reed et al. | 260—23 |
| 2,590,059 | 3/1952 | Winkler | 260—45.75 |
| 2,608,547 | 8/1952 | Hendricks et al. | 260—45.75 |
| 2,708,215 | 5/1955 | Kaganoff | 260—23 |
| 2,711,401 | 6/1955 | Lally | 260—45.7 |
| 2,838,428 | 6/1958 | Bohrer | 260—27 |
| 2,912,397 | 11/1959 | Housks et al. | 260—23 |
| 3,171,866 | 3/1965 | Meyer et al. | 260—897 |
| 3,202,622 | 8/1965 | Scullin et al. | 260—23 |

DONALD E. CZAJA, *Primary Examiner.*

LEON J. BERCOVITZ, *Examiner.*

R. A. WHITE, *Assistant Examiner.*